May 8, 1962  F. WÖSSNER  3,033,556
HYDROPNEUMATIC SUSPENSION UNIT
Filed Feb. 19, 1960  9 Sheets-Sheet 1

INVENTOR
Felix Wössner

May 8, 1962  F. WÖSSNER  3,033,556
HYDROPNEUMATIC SUSPENSION UNIT
Filed Feb. 19, 1960  9 Sheets-Sheet 4

INVENTOR
Felix Wössner

May 8, 1962   F. WÖSSNER   3,033,556
HYDROPNEUMATIC SUSPENSION UNIT
Filed Feb. 19, 1960   9 Sheets-Sheet 6

INVENTOR
Felix Wössner
By Richard Low
Ag't

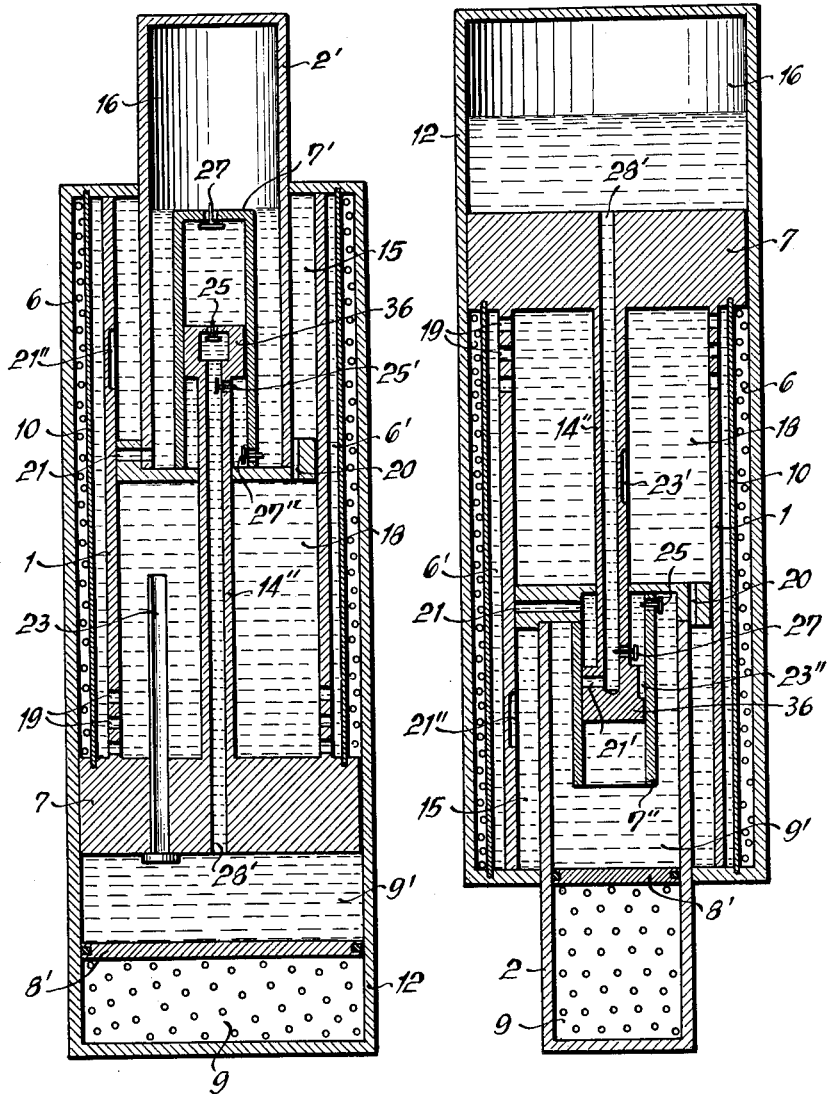

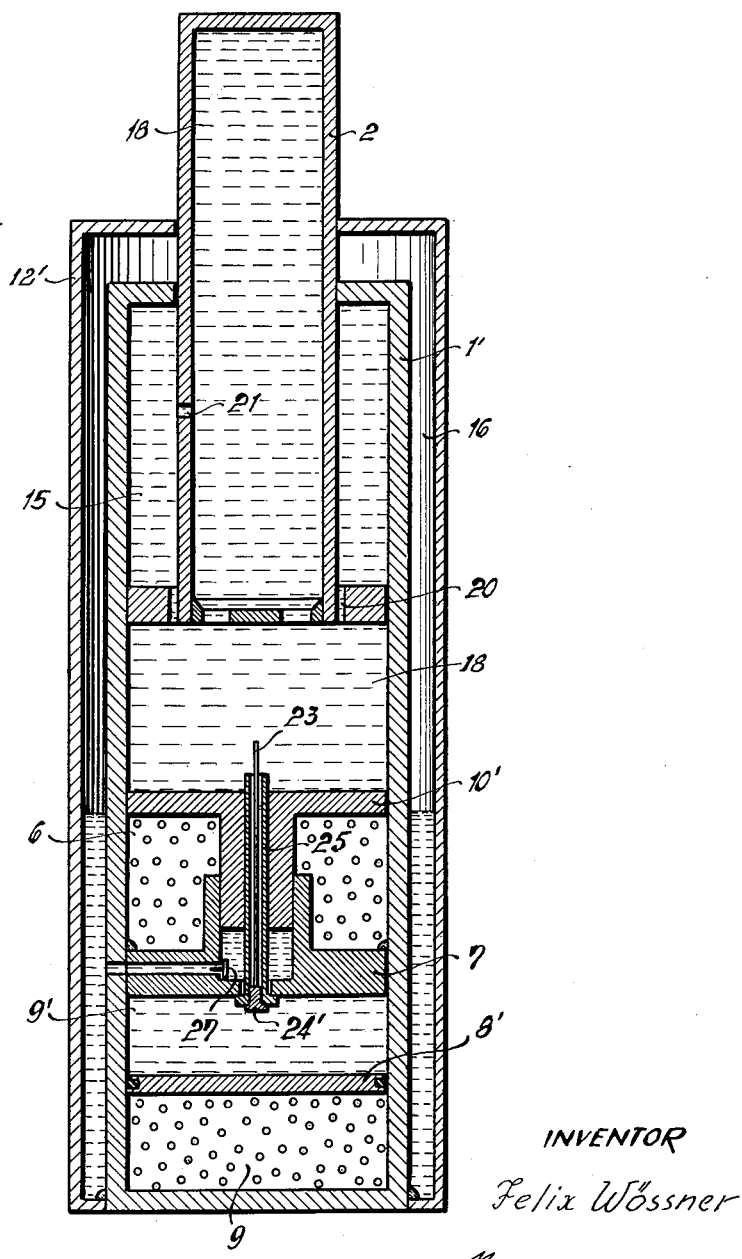

May 8, 1962 F. WÖSSNER 3,033,556
HYDROPNEUMATIC SUSPENSION UNIT
Filed Feb. 19, 1960 9 Sheets-Sheet 9

INVENTOR
Felix Wössner

United States Patent Office 3,033,556
Patented May 8, 1962

3,033,556
HYDROPNEUMATIC SUSPENSION UNIT
Felix Wössner, Schweinfurt (Main), Germany, assignor to Fichtel & Sachs A.G., Schweinfurt (Main), Germany, a corporation of Germany
Filed Feb. 19, 1960, Ser. No. 9,753
Claims priority, application Germany Feb. 27, 1959
16 Claims. (Cl. 267—64)

This invention relates to hydropneumatic suspension units, and more particularly to a hydropneumatic spring suspension unit which simultaneously acts as a shock absorber and an automatic levelling device for use in automotive vehicles and the like.

Automatic levelling devices are intended, for example, to maintain the road clearance of a vehicle at a constant value regardless of static or dynamic loading. Known devices of this kind are generally of two types:

In the first type, an external source of energy is employed to furnish a fluid spring medium under pressure which raises the level of the vehicle. Such devices include one or several compressors, accumulators or storage tanks, control valves, and extensive piping. They are heavy in weight, and relatively costly to build and to maintain in operating condition.

The second type of automatic levelling device consists essentially of a self-contained unit embodying resilient elements and means for their control. The energy required for raising the level of the vehicle is derived from the movement of the wheels of the vehicle which is transmitted to a pumping unit. Known devices of the second type are characterized by relatively slow response to level changes. When the level of the vehicle drops below the designed value, hydraulic liquid is pumped from a storage tank into the working space of a fluid spring unit which operates a hydraulic jack and gradually restores the road clearance.

Such an arrangement inherently requires a relatively long period to become fully effective. A sudden increase in load or a sudden change in the distribution of the load cannot be compensated instantaneously. The device cannot respond with adequate promptness to the level changes caused by cornering of a vehicle, by the application of power to the wheels, or by braking. Since it derives its motive power from the movement of the vehicle, it does not respond to the lowering of the vehicle body caused by loading while the vehicle stands still.

It is an object of the present invention to provide a suspension unit which is simultaneously effective as a spring element, a shock absorber, and an automatic levelling device, and which is practically instantaneously effective.

Another object is the provision of a suspension unit of the type described which is independent of an external source of energy, or an external source of operating fluid.

Yet another object is the provision of a levelling device which is capable of keeping a standing vehicle at a desired road clearance under varying loads.

A further object is the provision of a self-levelling suspension unit which compensates for the swaying tendency of a vehicle travelling over a curved path, and which prevents the so-called brake dive, that is, the tendency of the front end of a vehicle to drop when the brakes are applied. Correspondingly, the suspension unit of the invention is intended to prevent "power squat," the lowering of the rear portion of a vehicle when power is applied to the driven rear wheels.

With these and other objects in view, the invention provides a resilient suspension unit which is adapted to be interposed between the sprung and unsprung masses of a vehicle and the like in a manner well known in itself and not requiring further description. The unit comprises a cylinder member and piston member. The cylinder member partly encloses a working space which normally is entirely filled with liquid. The piston member is reciprocably movable into and out of the working space in sealing engagement with the cylinder member. The piston member forms a movable wall for the working space and substantially closes it. Either the cylinder member or the piston member is equipped with resilient means for exerting a pressure greater than atmospheric pressure on the liquid in the working space. This pressure will hereinafter be referred to as "normal pressure."

The suspension unit also includes a liquid reservoir and a pressure tank which may be located in either member. The pressure tank includes pressure means so that liquid can be yieldably retained in the pressure tank under a pressure greater than the normal pressure which prevails in the working space under operating conditions. The pressure tank can be connected with the working space by first valve means which are normally closed, but open when the piston member moves inwardly in the working space past a predetermined first position relative to the cylinder member.

Second valve means are provided for connecting the working space with the liquid reservoir. These valve means are also normally closed, but they are opened by outward movement of the piston means in the working space past a predetermined second position thereof. Liquid can be pumped from the reservoir to the pressure tank by a pump which is connected to the piston member and the cylinder member so as to be actuated by their relative reciprocating movement.

Other features and many of the attendant advantages of this invention will be readily appreciated as the same becomes better understood by reference to the following detailed description when considered in connection with the accompanying drawings in which like reference numerals designate corresponding parts throughout the several figures thereof, and wherein.

Figure 7:
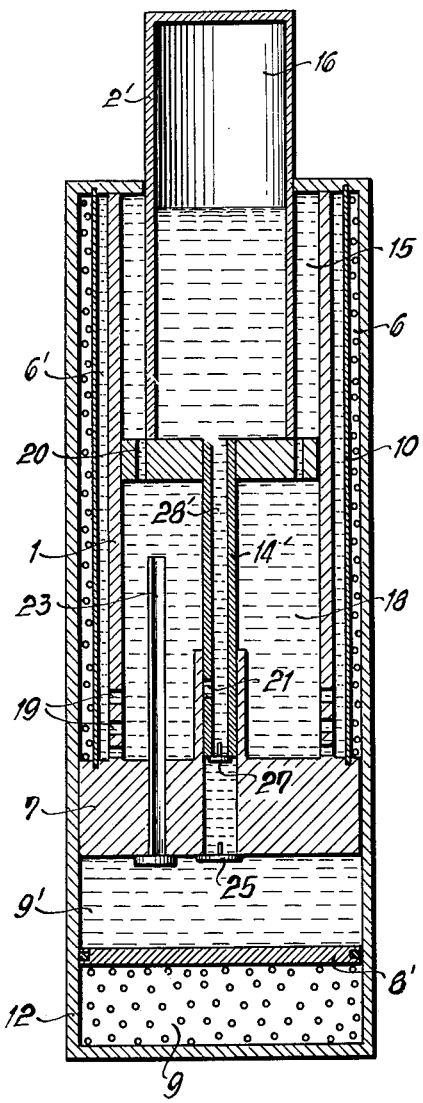

FIG. 7 schematically illustrates a modified embodiment of the invention with the reservoir arranged in the piston member, and the pressure tank in the cylinder member, the view again being in axial section.

Figure 1:
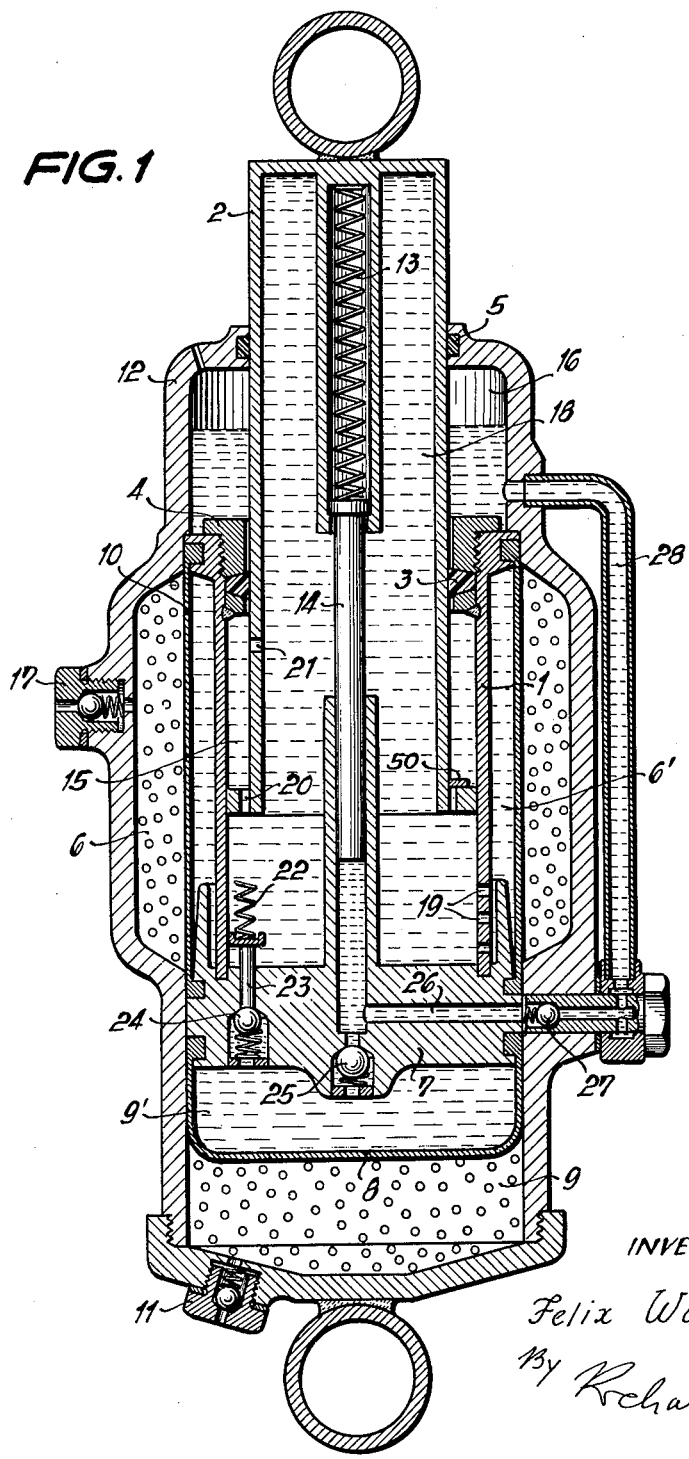
FIG. 1 is an axially sectional view of a preferred embodiment of the suspension unit of the invention in axially vertical position.
Figure 8:
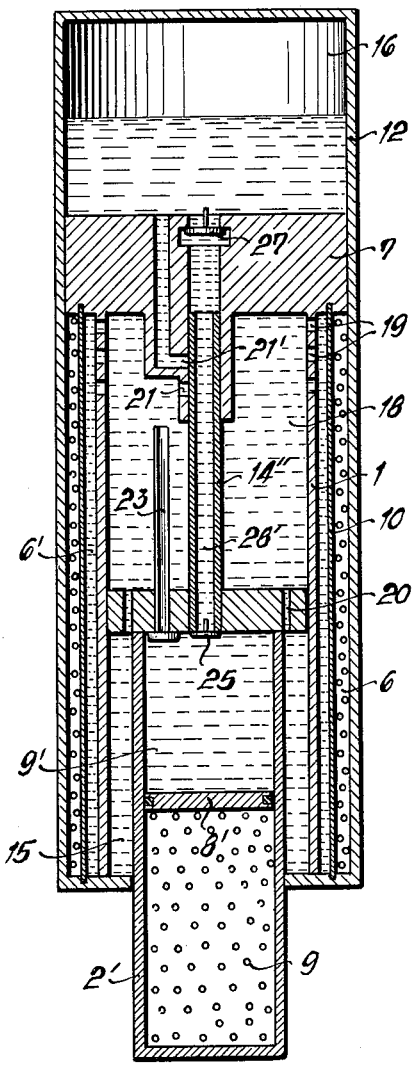
Figure 12:
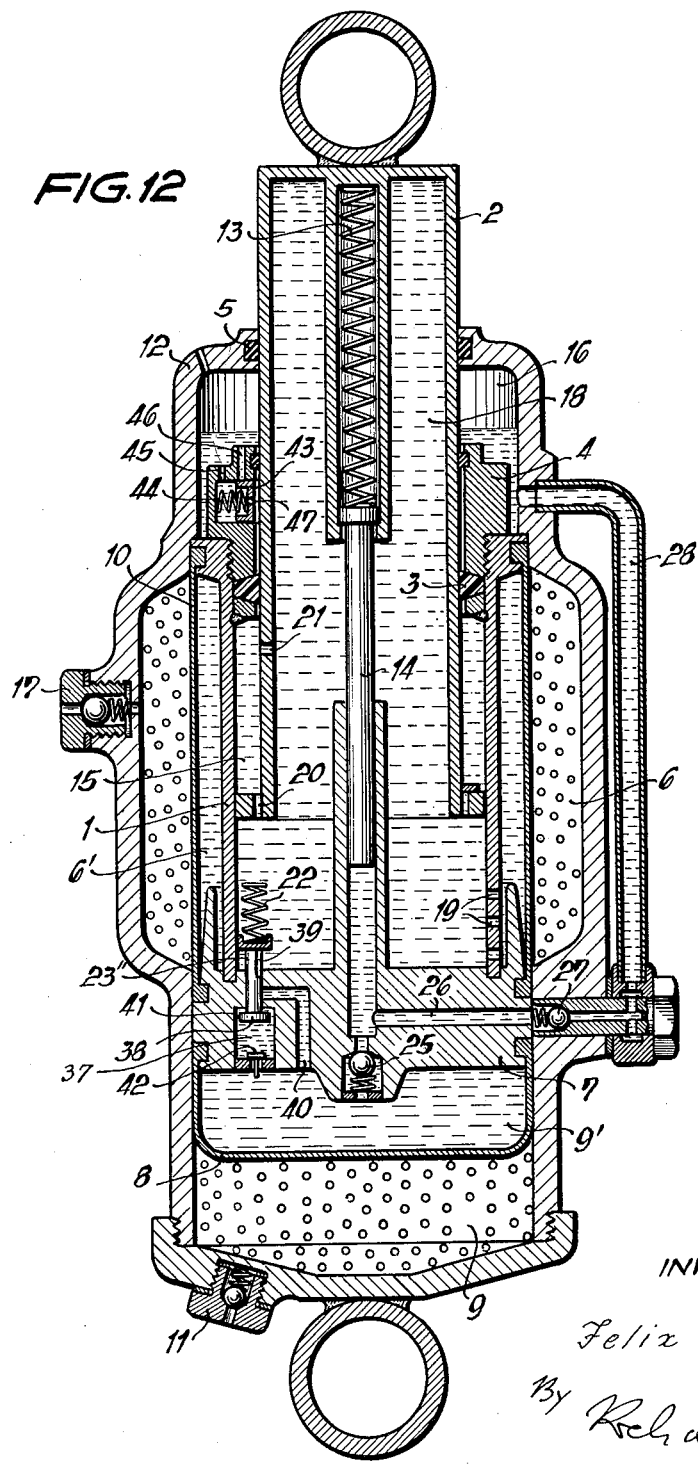

FIG. 8 similarly shows a suspension unit of the invention having the reservoir located in the cylinder member and the pressure tank in the piston member;

FIG. 9 shows a suspension unit mainly differing from that of FIG. 7 by the pump arrangement;

FIG. 10 is a sectional schematic view of a suspension unit similarly related to that shown in FIG. 8;

FIG. 11 schematically illustrates a suspension unit of the invention employing a pump arrangement indirectly actuated by the piston member; and FIG. 12 shows an embodiment of the invention similar to that of FIG. 1, but provided with a liquid-braked damping piston.

Referring now to the drawings in detail, and initially to FIG. 1, there is seen an approximately cylindrical casing 12 in the central portion of which a cylinder 1 is coaxially mounted. A flanged axial end portion of a hollow plunger 2 slidably engages the cylinder 1. The other end portion of the plunger 2 projects from the casing 12. The overall appearance of the device is similar to that of a conventional automotive shock absorber. The outer end of the plunger 2 and the casing 12 respectively are the outwardly visible portions of the piston member and of the cylinder member of the unit. They are equipped with well known attaching means for hinged respective connection to the frame and to an axle of a vehicle.

The plunger 2 and the adjacent end portion of the casing 12 define an annular vented reservoir 16. The inner end portion of the plunger, its flange, and the cylinder 1 define a damping cell 15 having the shape of an elongated hollow cylinder. The reservoir 16 and the damping cell 15 are sealed from each other by a high-pressure gasket ring 3. The gasket ring is held in place about the plunger 2 by means of a tubular plug 4 which threadedly engages a reinforced end of the cylinder 1. A rubber ring 5 seals the opening in the casing 12 through which the plunger 2 projects outward.

The cylinder 1 and the central portion of the casing 12 which is radially expanded enclose a spring chamber which is divided into a gas-filled compartment 6 and a liquid-filled compartment 6' by a flexible diaphragm 10 of substantially cylindrical tubular shape having a circumferential bead at either end. One of the beads is clamped between the reinforced end of the cylinder 1 and an adjacent portion of the casing 12. The other bead is clamped between a transverse plug member 7 and the casing 12. The plug member 7 which supports a circular edge of the cylinder 1 forms the bottom or head of the working space 18 which is otherwise enclosed by the plunger 2 and the cylinder 1.

A pressure tank is formed in the end portion of the casing 12 opposite the plunger 2 by the plug member 7. The pressure tank is divided by a resilient partition 8 of elastically extendable material into a gas filled compartment 9 and a liquid filled compartment 9'. The partition is cup-shaped and is provided with a bead along its open edge. The bead is clamped between the plug member 7 and the casing 12 and forms a tight seal.

An integral tubular portion projects from the plug member 7 towards the plunger 2 in the axis of the unit. The longitudinal bore extends into the main body of the plug member and serves as the cylinder of a pump arrangement which also includes a piston 14 which is resiliently mounted on the plunger 2 by means of a helical spring 13. The spring 13 is guided in an axial tubular extension of the plunger 2 which prevents kinking.

The gas filled compartment 6 of the spring chamber and the gas filled compartment 9 of the pressure tank are equipped with filling valves 17 and 11 respectively through which the compartments can be initially charged with gas under predetermined pressure. The valves also permit the pressure to be checked, and leakage losses sustained in operation can be made up.

The liquid compartment 6' of the spring chamber communicates with the end of the working space 18 adjacent the plug member by means of a plurality of radial openings 19 in the cylinder 1 so that liquid may flow through at least some of the openings 19 in any operating position of the plunger 2.

The flanged end portion of the plunger 2 is formed with axial passages 20 which connect the working space 18 with the damping cell 15. A portion of the plunger 2 spaced from the flanged end portion is provided with radial ports 21 only one of which is shown in FIG. 1. When the plunger 2 is deeply engaged in the cylinder 1, the ports 21 connect the damping cell 15 with the working space 18. When the plunger 2 moves outward from the position illustrated, the ports 21 are first obstructed by the gasket 3, and finally connect the working space 18 with the vented reservoir 16. Hinged flaps 50 are provided in the damping cell 15 over several of the passages 20 and automatically close the related passage when fluid flows outward from the cell.

A spring loaded ball valve 24 is arranged in an axial opening of the plug member 7. It is urged into the closed position by its spring and by the pressure prevailing in the pressure tank compartment 9'. The valve ball carries a buffer spring 22 on a pin 23. The spring and the pin extend into the inward terminal portion of the path of the plunger 2 so that the valve 24 is opened by the plunger when its flanged end portion approaches the plug member 7.

The longitudinal cylinder bore of the pump arrangement on the plug member 7 communicates with the pressure tank compartment 9' by way of a spring biased non-return valve 25 which permits fluid to be discharged under pressure in a direction toward the pressure tank only. A radial bore 26 in the plug member 7 connects the cylinder bore with a suction valve 27 and with the reservoir 16 by way of a pipe 28. The valve 27 is a spring biased ball valve arranged to permit liquid flow in a direction from the reservoir to the cylinder bore only.

When the suspension is ready for operation, the working space 18, the damping cell 15, the spring chamber compartment 6' and the pressure tank compartment 9' are completely filled with a hydraulic pressure liquid of the type commonly employed in hydraulic automotive brake systems. The liquid also fills the various passages described above and occupies the lower portion of the reservoir 16 as shown in FIG. 1. The gas compartments 6 and 9 of the spring chamber and of the pressure tank are filled with a compressed gas, such as nitrogen.

The afore-described device operates as follows:

By way of example, it will be assumed that the suspension of the invention is mounted between the frame and a wheel axle of a motor car. When the wheel travels over an obstacle in the road, the plunger 2 is pushed into the cylinder 1 by inertial forces. Liquid is displaced and passes through the openings 19 into the spring chamber compartment 6', thereby displacing the diaphragm 10 and further compressing the fixed weight of gas in the compartment 6. Upon relaxation of the pressure on the plunger 2, the gas pressure in the compartment 6 returns the plunger 2 to its original position.

A portion of the liquid originally displaced from the space 18 is forced through the passage 20 and ports 21 into the damper cell 15. Upon reversal of the direction of travel of the plunger 2, the hinged flaps 50 close several of the passages 20 and the reduced cross sectional flow area available produces a desirable dash pot effect to dampen oscillations which may otherwise be generated by the spring medium in the chamber 15.

When the plunger 2 is forced into the cylinder 1 near the limit of its inward stroke by static or dynamic loading of the car, the flanged end portion of the plunger 2 abuts against the buffer spring 22 which is compressed until its force is sufficient to open the ball valve 24 against the urging of its spring. The connection opened between the pressure tank compartment 9' and the working space 18 permits hydraulic liquid to pass, and to increase the pressure in the working space 18 so as to raise the car level.

When the axial pressure on the plunger 2 is reduced by unloading or because of shifting wheel pressure, the plunger 2 is urged outward of the cylinder 1 by the normal pressure maintained in the working space 18 by the compressed gas in the compartment 6. When the port 21 reaches a position of axial alignment with the reservoir 16, liquid flows into the reservoir from the working space until the resulting pressure drops returns the plunger 2 to a position in which the port 21 is located below the gasket 3. It is thus seen that any major displacement of the plunger 2 is counteracted automatically, whether the car is moving or not.

The afore-described mode of operation results in a gradual transfer of liquid from the pressure tank compartment 9' to the reservoir 16, and in simultaneous expansion of the gas in the pressure tank compartment 9. The amount of energy stored in the compartment 9 thus would limit the ability of the suspension unit to function unless liquid is returned from the reservoir 16 to the compartment 9' and the pressure in the compartment 9 of the pressure tank is restored.

The pump arrangement is provided for this purpose. The reciprocating movement of the plunger 2 in the cylinder 1 is resiliently transmitted to the piston 14 by the helical spring 13. Outward movement of the plunger 2 withdraws the piston 14 from the cooperating cylinder bore and causes liquid to be drawn in from the reservoir through the pipe 28, suction valve 27, and radial bore 26. During the inward movement of the plunger 2 and of the coupled piston 14, the liquid is expelled under pressure into the pressure tank compartment 9' through the non-return valve 25. The pump arrangement becomes inoperative when the pressure in the tank compartment 9' can no longer be overcome by the spring 13. Further reciprocating movement of the plunger 2 merely causes alternating compression and expansion of the spring 13 without corresponding movement of the piston 14. Upon withdrawal of liquid from the compartment 9' through the valve 24, the pumping effect is automatically restored.

The embodiments of the invention illustrated in FIGS. 2 to 6 are basically similar to that shown in FIG. 1 and operate in the same manner. They differ from the first-described suspension unit by their pump arrangements which include a piston 14' fixedly secured to the plunger 2 in an axial position so that other means must be provided for limiting the pressure in the pressure tank to a predetermined value.

Figure 2:
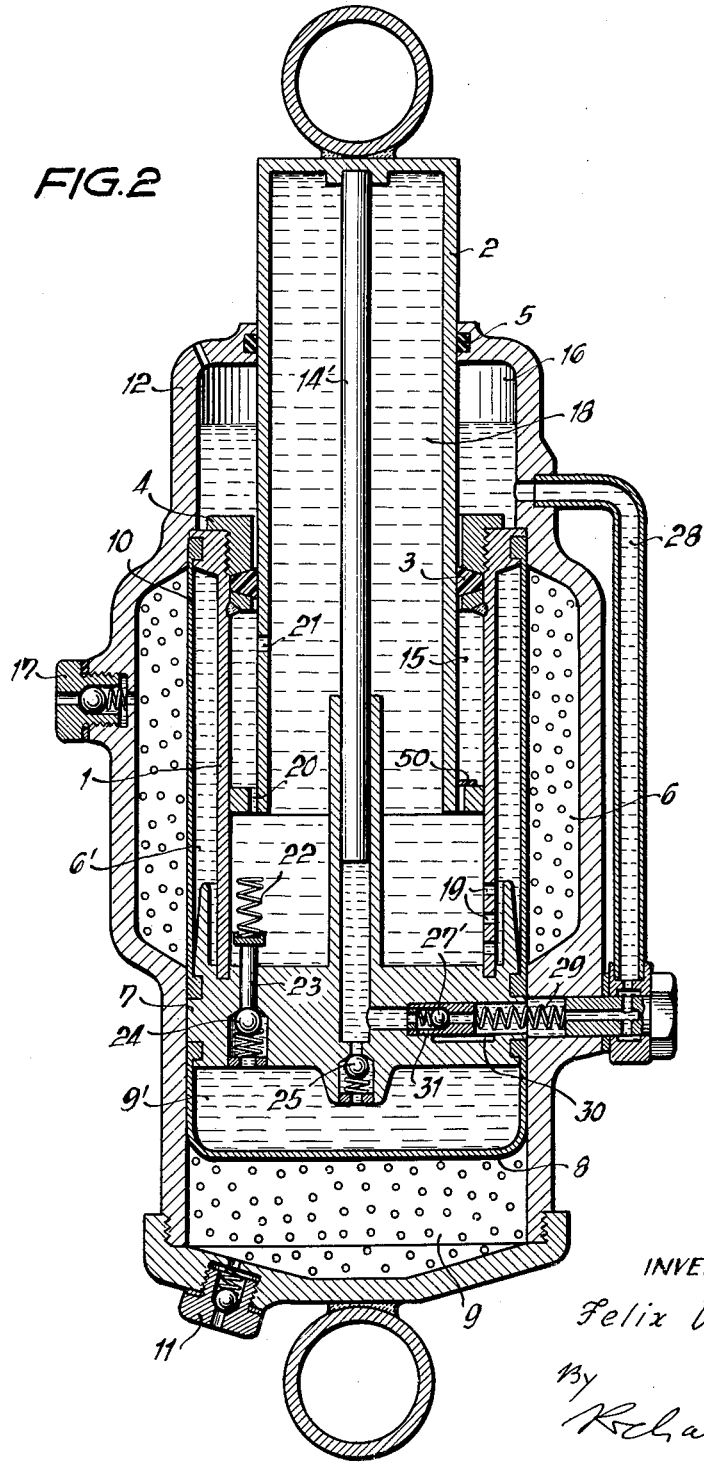
FIG. 2 shows a corresponding view of a modified embodiment of the suspension of the invention, differing from that of FIG. 1 mainly in the pump arrangement.

In the unit illustrated in FIG. 2, the suction valve 27' includes a tubular plug which is longitudinally slidable in the bore 26. The plug has a stepped axial passage which provides a seat for a ball valve member which is spring biased towards the closed position. A longitudinal groove 30 in the wall of the bore 26 can be aligned with a radial opening 31 in the plug to provide a by-pass for liquid flow around the ball valve member and the plug. The plug is urged out of a position of alignment of the opening 31 and the groove 30 by a helical spring 29 which acts on the plug in opposition to the pressure in the pump cylinder.

The suction valve 27' operates in the same manner as the valve 27 of FIG. 1 until the pressure in the tank compartment 9' becomes high enough to prevent opening of the non-return valve 25, and the resulting pressure in the pump cylinder causes radially outward displacement of the suction valve 27' against the restraint of the spring 29, whereby a by-pass is formed and liquid may return from the pump to the reservoir 16 during the compression stroke of the piston 14'. The maximum pressure attained in the compartment 9' depends on the force of the spring 29, and can thus be adjusted by axially shifting the fixed abutment of the spring.

Figure 3:
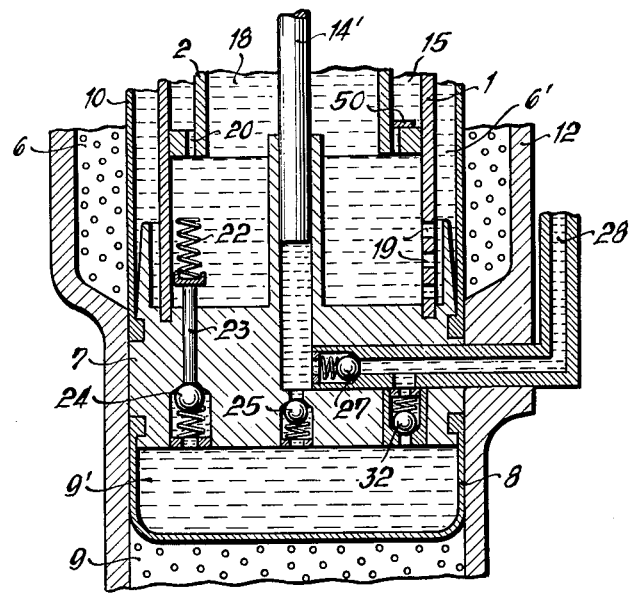
FIG. 3 illustrates the pump arrangement of another modified embodiment.
Figure 4:
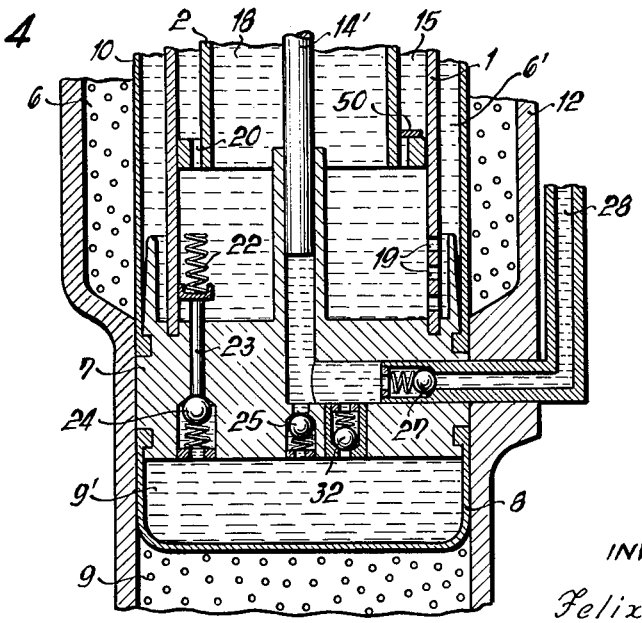
FIG. 4 shows the pump arrangement of yet another modified embodiment.

The pump arrangement of the suspension units of which portions only are shown in FIGS. 3 and 4 limit the pressure that can be built up in the pressure tank compartment 9' by means of a pressure relief valve 32 which communicates with the bore 26, and which is set to open at a predetermined pressure differential. In the unit seen in FIG. 3, the discharge orifice of the valve 32 in the bore 26 is located between the suction valve 27 and the reservoir 16 so as to return liquid directly to the reservoir. In the example of a pumping arrangement illustrated in FIG. 4, the discharge orifice of the valve 32 in the bore 26 is intermediate the suction valve 27 and the cylinder space of the pump arrangement. Because of the rigid connection between the piston 14 and the plunger 2, the pressure in the compartment 9' which is exerted on the piston 14 thus counteracts inward movement of the plunger 2 when the pressure tank is charged to its desired pressure.

Figure 5:
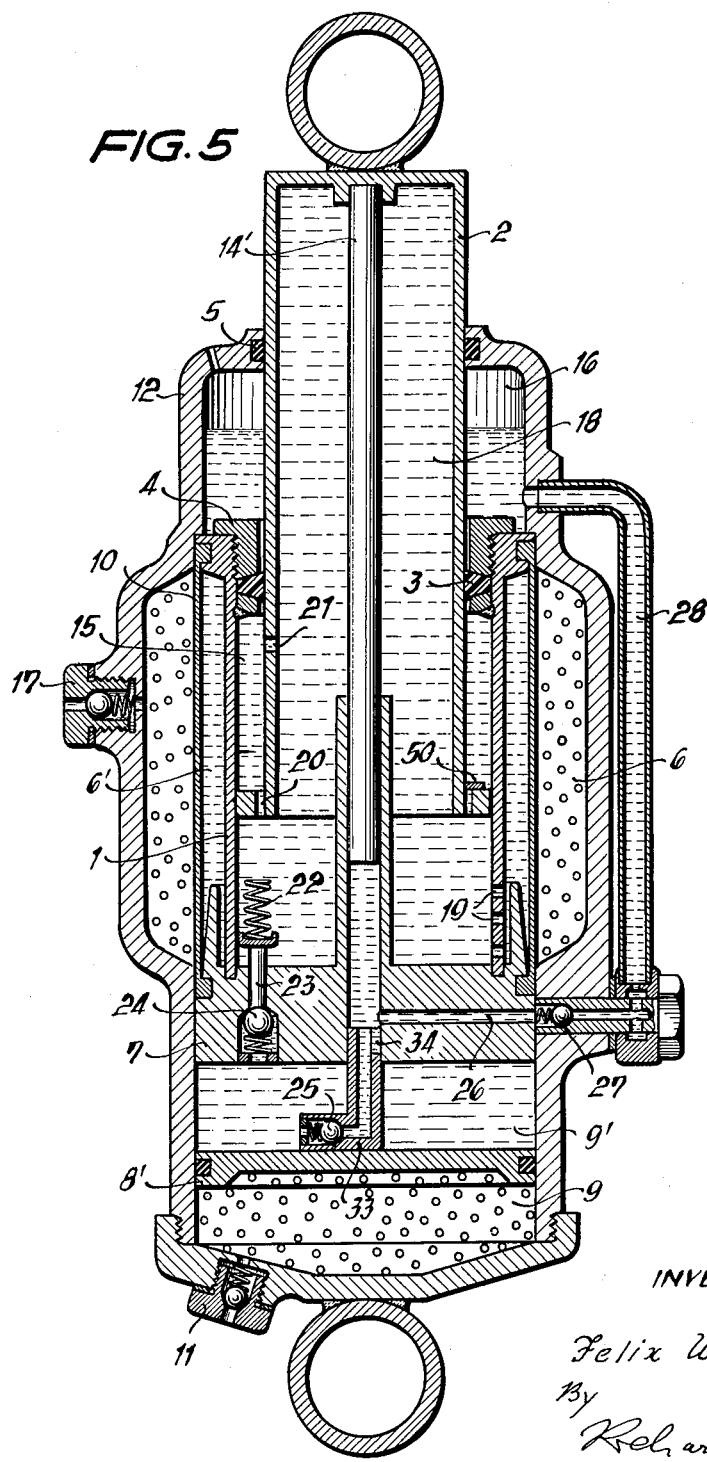
FIG. 5 illustrates a suspension unit according to this invention including an additionally modified pump arrangement, the unit again being shown in axial section.
Figure 6:
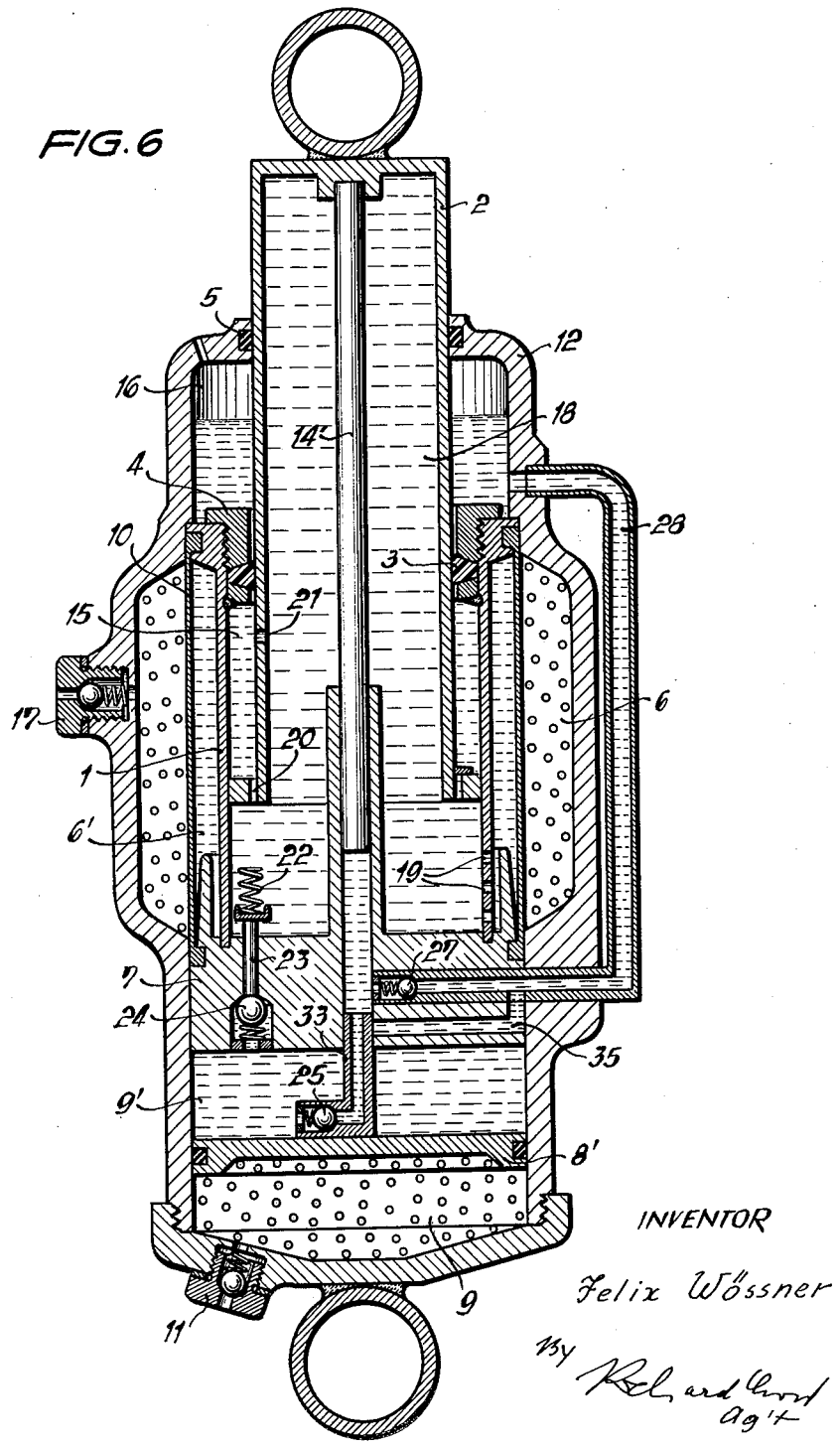
FIG. 6 shows a similar view of a suspension unit of the invention which employs a further modified pump arrangement.

In the suspension units of the invention shown in FIGS. 5 and 6, the resilient partition 8 of the pressure tank has been replaced by a floating piston 8' the edges of which are in movable sealing engagement with the casing 12, and which performs the same function as the partition 8. The floating piston 8' carries a tubular control slide 33 which is axially movable in the cylinder bore of the plug member 7 and the central bore of which holds the non-return valve 25. The end portion of the slide 33 at its orifice in the cylinder bore is radially slotted at 34. The other orifice of the slide 25 communicates with the pressure tank compartment 9'.

Upon each compression stroke of the piston 14', liquid is forced through the non-return valve 25 into the pressure tank compartment 9' and the floating piston is displaced in a downward direction as seen in FIG. 5, thereby gradually withdrawing the slide 33 from the plug member 7. Upon further downward movement from the position shown, the slot 34 establishes open communication between the cylinder space of the pumping arrangement and the pressure tank compartment 9'. Further reciprocating movement of the piston 14' then merely draws in an amount of liquid from the tank compartment 9' on the suction stroke to return it on the subsequent pressure stroke. The slot 34 limits the maximum amount of liquid in the compartment 9', and thus indirectly limits the pressure.

The apparatus shown in FIG. 6 operates in a similar manner. The plug member 7 is provided with an additional duct 35 which has an orifice in the cylinder space of the pumping arrangement below that of the bore 26, and which freely communicates with the reservoir 16. The end portion of the tubular control slide 33 is not slotted. It uncovers the orifice of the duct 35 when the floating piston 8' reaches its limit position, thus opening a by-pass which permits return of liquid from the pump cylinder space to the reservoir 16 during the pressure stroke of the piston 14' when a predetermined amount of liquid is retained in the pressure tank.

It will be understood that in all embodiments illustrated and described above, the pumping arrangement again becomes automatically effective when the liquid pressure or the amount of liquid in the compartment 9' of the pressure tank drops below the limiting value.

In the examples illustrated so far, reservoir 16, the pressure tank 9, 9', the damping cell 15 and the spring chamber 6, 6' were formed within the cylinder member of the suspension unit, and the working space 18 was formed by connecting cavities provided both in the piston member and the cylinder member. The locations of the several fluid holding cavities of the suspension unit may, however, be varied to provide additional advantages, and to suit special requirements. Modified versions of the suspension unit of the invention are schematically illustrated in FIGS. 7 to 11 to show different arrangements of the fluid holding cavities, and also additional modifications of the pumping arrangement. Means for limiting the pressure or the volume of the liquid in the pressure tank have not been shown in these schematic representations for the sake of clarity. Attaching means for securing the piston member and the cylinder member have also been omitted, but it will be understood that these and other necessary details more fully described above are included in each of the embodiments schematically shown in FIGS. 7 to 11.

Referring now to FIG. 7 in more detail, the plunger 2' is hollow, but its cavity is closed by a substantially continuous inner transverse end wall member of the plunger 2' which engages the cylinder 1. The plunger cavity serves as a reservoir 16. The piston 14" is axially secured to the plunger 2' and formed with an axial conduit 28' which communicates with the reservoir 16. The working space 18 of the suspension unit is enclosed by the end wall member of the plunger 2', the cylinder 1, and the plug member 7 an axially extending bore of which provides a cylinder space in which the piston 14" reciprocates during movement of the plunger 2'. The suction valve 27 is arranged at the orifice of the conduit 28' in the cylinder space, and a non-return valve 25 is provided between the cylinder space and the pressure tank 9, 9' as in the devices of FIGS. 1 to 6. The port 21 is formed in the wall of the tubular piston 14" to provide a pressure relief connection between the working space 18 and the reservoir 16 when the plunger 2' moves outward of the cylinder 1 past a predetermined position in which the port 21 emerges from the cylinder space in the plug member 7, and additional liquid is admitted under pressure to the working space 18 from the pressure tank compartment 9' when downward movement of the plunger 2' reaches a predetermined point to actuate the valve pin 23.

Whereas in the examples of the suspension unit described so far, the piston member was shown to be on top in the usual installed position of the unit, FIG. 8 illustrates an inverse arrangement. The plunger 2' encloses the pressure tank compartments 9 and 9' which are separated by a floating piston 8', and the reservoir 16 occupies the end portion of the casing 12 defined by the plug member 7. The tubular piston 14" is mounted on the inner end wall member of the plunger 2'. Its axial conduit 28' freely communicates with the cylinder space in the plug member 7, and the orifice of the conduit 28' at the pressure tank compartment 9' in the plunger 2' is provided with the non-return valve 25. The suction valve 27 is arranged in the plug member 7 between the cylinder space and the reservoir 16. The pin 23 projects into the working space 18 from the plunger 2'. It opens a connection between the working space and the pressure tank compartment 9' when the pin 23 abuts against the plug member 7 during inward movement of the plunger 2'. A by-pass conduit 21' connects the cylinder space in the plug member 7 with the reservoir 16. In the plunger position illustrated in FIG. 8, the orifice of the by-pass conduit 21' in the cylinder space is closed by the tubular piston 14". Upon outward movement of the plunger 2', the orifice is exposed, and liquid under pressure is released from the cylinder space into the reservoir in the same manner and for the same purpose as described above in more detail. Upon further outward movement of the plunger 2, the piston 14" uncovers a port 21 which communicates with the working space 18, and thus provides a passage for escape of liquid from the working space through the port 21, the conduit 28', and the by-pass 21' into the reservoir 16.

The two embodiments of the invention shown in FIGS. 9 and 10 bear the same relationship to each other as those of FIGS. 7 and 8. The locations of the reservoir 16 and of the pressure tank 9, 9' in the two figures are reversed. FIGS. 9 and 10 show pump arrangements in which the cylinder space is provided within the piston member of the suspension unit, and the pump piston is fixedly fastened to the unit's cylinder member.

As seen in FIG. 9, the plunger 2' encloses a cavity which serves as a reservoir 16, and into which a pump cylinder 7' projects from the closed inner end of the plunger 2'. A tubular pump piston 14" is mounted on a plug member 7, and the axial conduit 28' of the piston extends through the plug member 7 into the pressure tank compartment 9'. The enlarged free end portion 36 of the piston 14" forms a double acting piston member having a circular face in one space of the pump cylinder 7' which communicates with the reservoir 16 by a suction valve 27, and an annular face in the other space of the pump cylinder 7' which is equipped with a suction valve 27" for connection to the reservoir 16. The two pump spaces respectively communicate with the conduit 28' and thus with the pressure tank compartment 9' when the non-return valves 25 and 25' are open. The pump arrangement delivers liquid from the reservoir 16 to the pressure tank compartment 9' during both strokes of the plunger 2'. An axially extending groove 21" in the cylinder 1 registers with a radial port 21 in the inner end wall member of the plunger 2' to release liquid from the working space 18 of the suspension unit to the reservoir when the plunger 2' moves outward past a predetermined position. A pin 23 is mounted on the plug member 7 to admit liquid under pressure from the pressure tank compartment 9' into the work space 18 upon inward movement of the plunger 2' past another predetermined position.

In the arrangement shown in FIG. 10, the plunger 2' encloses the pressure tank 9, 9' into which an open pump cylinder 7" projects from the inner end wall of the plunger 2'. The tubular piston 14" which is fixedly mounted on the plug member 7 carries a free end portion 36 of enlarged diameter. Its free circular face is in contact with liquid under pressure from the tank compartment 9' which freely enters the open end of the cylinder 7", and urges the plunger 2' to move outward of the cylinder 1. The annular face of the end portion 36 is operative in a cylinder space to which liquid is admitted during the inward stroke of the plunger 2' through a suction valve 27 arranged at the orifice of a passage which leads from the reservoir 16 through the conduit 28' in the hollow stem of the piston 14" and into the cylinder space. A non-return valve 25 in the wall of the pump cylinder 7" controls flow of liquid from the pump space to the pressure tank compartment 9'.

Axially extending grooves 23' and 23" are respectively formed in the outer circumferences of the piston 14" and of its end portion 36, and are spaced in such a manner as to provide a continuous passage from the pressure tank compartment 9' through the cylinder space of the pump cylinder 7" into the working space 18 to supply additional liquid under pressure when the plunger 2' is forced deeply into the cylinder 1 by a heavy static or dynamic load.

An axial groove 21" in the cylinder 1 is alignable with a radial port 21 in the inner end portion of the plunger 2', and a by-pass conduit 21' in the end portion 36 of the piston 14" to release liquid from the damping cell, and thus from the working space 18 when the plunger 2' moves outward of the cylinder 1 past a predetermined position, so as to induce return of the plunger to its normal intermediate position illustrated in FIG. 10.

In the embodiment of the invention schematically represented in FIG. 11, the spring chamber arrangement 6, 6' which in effect constitutes a spring of the air-oil type, has been replaced by a pneumatic spring 6 the expansion and contraction of which provides the source of movement for a pumping arrangement which returns liquid under pressure from a reservoir 16 to a pressure tank compartment 9'.

The plunger 2 is reciprocably movable in a cylinder 1' in which a transverse plug member 7 is fixedly mounted. The plug member is formed with an axial pump cylinder bore which guides the narrow portion of a differential piston 10'. The portion of the differential piston 10' which has a greater diameter sealingly engages the cylinder 1' and separates the space between the plug member 7 and the plunger 2 into a working space 18 and a gas compartment 6 which serves as a pneumatic spring chamber.

The cylinder 1' is spacedly surrounded by a casing 12', and the intermediate space serves as a reservoir 16. A radial bore in which the suction valve 27 is arranged connects the reservoir 16 with the axial pump cylinder in the plug member 7. A non-return valve 25 permits passage of liquid from the pump cylinder to the pressure tank compartment 9' at a predetermined pressure. A valve arrangement 24' admits liquid under pressure to the working space 18 from the pressure tank compartment 9' when the plunger 2 in its inward movement abuts against the pin 23.

The modified pump arrangement illustrated in FIG. 11 is indirectly actuated by the movement of the plunger 2. Since the liquid in the working space 18 is practically non-compressible, the differential piston 10' is forced to participate in the movement of the plunger 2, and its narrow portion acts as a pump piston in the cylinder bore of the plug member 7.

The embodiment of the invention illustrated in FIG. 12 is similar to that shown in FIG. 1, but differs from the latter by provisions made for smoother reversal of the direction of plunger travel when inner and outer predetermed positions are reached.

Upon inward movement, the plunger 2 abuts against a buffer spring 22 carried by a pin 23" which is axially slidable in a closely conforming opening of the plug member 7. The face of the plug member 7 in the pressure tank compartment 9' is formed with an axially extending cylindrical recess 37 which is separated from the pressure tank by a check valve 42 which admits liquid from the pressure tank, but prevents liquid flow in the opposite direction.

The downward movement of the pin 23" under the pressure exerted by the plunger 2 on the spring 22 is retarded by a damping piston 38 which extends over almost the full cross section of the recess 37, and leaves but a narrow circumferential clearance 41 for axial flow of liquid between the two axial portions of the recess 37 which are separated by the piston 38. The pin 23" is provided with an axial groove 39 which is adapted to register with the inner orifice of a duct 40. The duct leads to the pressure tank compartment 9' and admits liquid under pressure from the compartment 9' to the working space 18 when the plunger 2 is forced deeply into the cylinder 1.

Smoother reversal of movement of the plunger 2 from an outward to an inward direction is achieved by a similar damping arrangement interposed in the path of the liquid from the working space 18 into the reservoir 16 when the plunger 2 reaches another predetermined position during its outward movement.

A damping piston 43 is arranged in an inwardly open radial recess of the tubular plug 4 and is alignable with the radial port 21 in the plug 2 during outward movement of the plunger 2. The piston 43 is urged into contact with the plunger 2 by a spring 44. A narrow opening 45 and a wider opening 46 extend from the recess through the plug 4 into the reservoir 16. Their orifices in the recess are radially spaced.

When the port 21 registers with the recess in the plug 4, the piston 43 is urged radially outward against the restraint of its spring 44 and liquid is displaced by the piston 43 through the opening 45 towards the reservoir 16. Upon continued movement of the piston 43, the wider opening 46 is uncovered and the liquid pressure in the working space 18 which causes outward movement of the plunger 2 is dissipated by liquid flow to the reservoir 16 from the space 18. With the port 21 out of register with the piston 43, any difference in liquid pressure on the two piston faces is equalized by flow through a very narrow channel 47 in the damping piston 43, and the piston is returned to the illustrated position by the spring 44.

The several embodiments of the invention illustrated and described constitute suspension units for the wheels of vehicles and the like which are simultaneously effective as spring elements, as shock absorbers, and as automatic levelling devices. Their action is substantially instantaneous since they do not rely on energy supplied from an external source or gradually generated by mechanism in the unit itself, but draw on an integral source of stored energy which is automatically kept charged to full capacity. The units are operative whether the vehicle on which they are mounted is travelling or standing still to maintain a designed road clearance of the vehicle. Because of their rapid response to varying load conditions, they are capable of minimizing or eliminating brake dive or power squat, and the swaying of a vehicle body during cornering.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A resilient suspension unit for a vehicle and the like, comprising, in combination a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means being operatively connected to said cylinder member and to said piston member for pumping liquid from said reservoir to said pressure tank means when said piston member reciprocably moves relative to said cylinder member.

2. A resilient suspension unit for connecting two elements of a vehicle and the like, comprising, in combination, a cylinder member defining a working space therein for holding a liquid; a piston member reciprocably movable into and out of said working space in sealing engagement with said cylinder member so as to substantially close said working space; attaching means on said cylinder member and on said piston member respectively for attaching said members to respective ones of said elements; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means being operatively connected to said cylinder member and to said piston member for pumping liquid from said reservoir to said pressure tank means when said piston member reciprocably moves relative to said cylinder member.

3. A resilient suspension unit for a vehicle and the like, comprising, in combination, a cylinder member defining a working space therein for holding a liquid; a piston member reciprocably movable into and out of said working space in sealing engagement with said cylinder member so as to close substantially said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; pump means communicating with said reservoir and said pressure tank means, said pump means being operatively connected to said cylinder member and to said piston member for pumping liquid from said reservoir to said pressure tank means when said piston member reciprocably moves relative to said cylinder member; and means for limiting the pressure in said pressure tank means.

4. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means including a piston element operatively connected to one of said members and a cylinder element operatively connected to the other one of said members for pumping liquid from said reservoir to said pressure tank means when said piston member reciprocably moves relative to said cylinder member.

5. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means including a piston element operatively connected to one of said members and a cylinder element operatively connected to the other one of said members for pumping liquid from said reservoir to said pressure tank means when said piston member reciprocably moves relative to said cylinder member, one of the connections between an element of said pump means and the respective member including a yieldably resilient link member, whereby the pressure produced in said pressure tank means is limited.

6. A resilient suspension unit for a vehicle and the like, comprising, in combination a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; pump means communicating with said reservoir and said pressure tank means, said pump means being operatively connected to said cylinder member and to said piston member for pumping liquid from said reservoir to said pressure tank means when said piston member reciprocably moves relative to said cylinder member; and pressure release valve means communicating with said reservoir and said pressure tank means for limiting the pressure difference between said reservoir and said pressure tank means.

7. A resilient suspension unit for a vehicle and the like, comprising, in combination a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member;

second valve means for connecting said working space with said liquid reservoir, said second valve means being normally closed and arranged to open responsive to outward movement of said piston member in said working space past a predetermined second position; a conduit connecting said reservoir and said pressure tank means; a pump in said conduit including a cylinder and a piston reciprocable in said cylinder; a non-return valve in said conduit intermediate said cylinder and said pressure tank means for permitting liquid flow in a direction toward said tank means only; a non-return valve in said conduit intermediate said cylinder and said reservoir for permitting liquid flow in a direction toward said cylinder only; pressure relief means for connecting said reservoir and said cylinder when the liquid pressure difference between said reservoir and said cylinder exceeds a predetermined value; and connecting means connecting said cylinder and said piston to a respective one of said members for actuation of said pump when said piston member reciprocably moves relative to said cylinder member.

8. A resilient suspension unit for a vehicle and the like, comprising, in combination a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; a second valve means for connecting said working space with said liquid reservoir, said second valve means being normally closed and arranged to open responsive to outward movement of said piston member in said working space past a predetermined second position; pump means communicating with said reservoir and said pressure tank means, said pump means being operatively connected to said cylinder member and to said piston member for pumping liquid from said reservoir to said pressure tank means when said piston member reciprocably moves relative to said cylinder member; and overflow means in said pressure tank means for limiting the amount of liquid therein.

9. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; a conduit connecting said reservoir and said pressure tank means; a pump in said conduit including a cylinder and a piston reciprocable in said cylinder; a non-return valve in said conduit intermediate said cylinder and said pressure tank means for permitting liquid flow in a direction toward said tank means only; a non-return valve in said conduit intermediate said cylinder and said reservoir for permitting liquid flow in a direction toward said cylinder only; a by-pass conduit connecting said pressure tank means and said cylinder; control means in said by-pass conduit, said control means being normally closed and responsive to the amount of liquid in said pressure tank means for opening said by-pass conduit when the liquid in said pressure tank means exceeds a predetermined amount; and connecting means connecting said cylinder and said piston to a respective one of said members for actuation of said pump when said piston member reciprocably moves relative to said cylinder member.

10. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in said cylinder member, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means being operatively connected to said cylinder member and to said piston member for pumping liquid from said reservoir to said pressure tank means when said piston member reciprocably moves relative to said cylinder member.

11. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in said piston member, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and pump means communicating with said reservoir and said pressure tank means, said pump means being operatively connected to said cylinder member and to said piston member for pumping liquids from said reservoir to said pressure tank means when said piston member reciprocably moves relative to said cylinder member.

12. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; a conduit connecting said reservoir and said pressure tank means; a pump in said conduit including a cylinder and a piston reciprocable in said cylinder; and connecting means connecting said cylinder to said cylinder member, and said piston to said piston member for actuation of said pump when said piston member reciprocably moves relative to said cylinder, said pump being effective to pump liquid from said reservoir to said pressure tank means.

13. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; a conduit connecting said reservoir and said pressure tank means; a pump in said conduit including a cylinder and a piston reciprocable in said cylinder; and connecting means connecting said piston to said cylinder member, and said cylinder to said piston member for actuation of said pump when said piston member reciprocably moves relative to said cylinder, said pump being effective to pump liquid from said reservoir to said pressure tank means.

14. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in said piston member; pressure tank means in said cylinder member, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; a piston mounted on said cylinder member, said piston member being formed with a cylinder cavity therein receiving said piston for reciprocating pumping movement when said piston member moves into and out of said working space; a conduit connecting said cylinder cavity with said pressure tank means; another conduit connecting said cylinder cavity with said reservoir; and non-return valve means in said conduits for passage of liquid in a direction from said reservoir to said cylinder cavity, and therefrom to said pressure tank means only.

15. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; resilient means in one of said members for exerting a normal pressure on a liquid in said working space; a liquid reservoir in said piston member; pressure tank means in said cylinder member, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; a piston mounted on said cylinder member, said piston member being formed with a cylinder cavity therein receiving said piston for reciprocating pumping movement when said piston member moves into and out of said working space; a conduit at least partially extending in said piston and connecting said cylinder cavity with said pressure tank means; another conduit connecting said cylinder cavity with said reservoir; and non-return valve means in said conduits for passage of liquid in a direction from said reservoir to said cylinder cavity, and therefrom to said pressure tank means only.

16. A resilient suspension unit for a vehicle and the like, comprising, in combination, a cylinder member defining a working space therein for holding a liquid; a piston member reciprocably movable into and out of said working space in sealing engagement with said cylinder member so as to substantially close said working space; a resiliently movable wall portion on said cylinder member in said working space for exerting a normal pressure on a liquid in said working space; a liquid reservoir in one of said members; pressure tank means in one of said members, said pressure tank means including pressure means for maintaining a liquid in said pressure tank means under a pressure greater than said normal pressure; first valve means for connecting said working space with said pressure tank means, said first valve means being normally closed, and arranged to open responsive to inward movement of said piston member in said working space past a predetermined first position of said piston member relative to said cylinder member; second valve means for connecting said working space with said liquid reservoir, said second valve means being normally closed and arranged to open responsive to outward movement of said piston member in said working space past a predetermined second position; and a pump including a cylinder element and a piston element, one of said pump elements being mounted on said cylinder member, and the other one of said pump elements being mounted on said wall portion, said pump communicating with said reservoir and said pressure tank means for pumping liquid from said reservoir to said pressure tank means when said wall portion reciprocably moves relative to said cylinder member.

References Cited in the file of this patent

UNITED STATES PATENTS 2,976,032     Sampietro  ------------ Mar. 21, 1961

FOREIGN PATENTS 798,811     Great Britain ---------- July 30, 1958